United States Patent [19]
Lind et al.

[11] Patent Number: 5,679,422
[45] Date of Patent: Oct. 21, 1997

[54] COEXTRUDED FILM FOR CHUB PACKAGES

[75] Inventors: Keith D. Lind; Johnny Q. Zheng; Gregory K. Jones, all of Appleton; Dennis Kittel, Neenah, all of Wis.

[73] Assignee: American National Can Company, Chicago, Ill.

[21] Appl. No.: 377,080

[22] Filed: Jan. 25, 1995

[51] Int. Cl.$^6$ ............... B32B 27/30; B32B 27/32
[52] U.S. Cl. ............... 428/34.8; 428/35.4; 428/35.7; 428/36.7; 428/515; 428/516; 428/518; 428/520
[58] Field of Search ............... 428/34.9, 35.4, 428/35.2, 515, 516, 34.8, 36.6, 36.91, 520, 518, 35.7

[56] References Cited

U.S. PATENT DOCUMENTS

| | | | |
|---|---|---|---|
| 4,457,960 | 7/1984 | Newsome | 428/35 |
| 4,557,780 | 12/1985 | Newsome et al. | 156/244.11 |
| 4,605,460 | 8/1986 | Schirmer | 156/229 |
| 4,894,107 | 1/1990 | Tse et al. | 156/229 |
| 4,909,726 | 3/1990 | Bekele | 428/34.3 |
| 4,937,112 | 6/1990 | Schirmer | 428/34.3 |
| 4,997,710 | 3/1991 | Pockat et al. | 428/349 |
| 5,004,647 | 4/1991 | Shah | 428/475.8 |
| 5,037,683 | 8/1991 | Schirmer | 156/244.11 |
| 5,089,073 | 2/1992 | Schirmer | 428/36.7 |
| 5,374,459 | 12/1994 | Mumpower et al. | 428/36.7 |

FOREIGN PATENT DOCUMENTS

| | | |
|---|---|---|
| 9409060 | 4/1994 | WIPO. |
| 9504761 | 2/1995 | WIPO. |

OTHER PUBLICATIONS

Vander Sanden et al, "A New Family of Linear Ethylene Polymers With Enhanced Sealing Performance" 1991.
Polymers Laminations and Coatings Conference (289–296).
Vander Sanden et al., "Exact™ Linear Ethylene Polymers For Enhanced Sealing Performance"; ANTEC (154–158) 1992.

*Primary Examiner*—Paul J. Thibodeau
*Assistant Examiner*—Donald Lawrence Tarazano
*Attorney, Agent, or Firm*—Mary J. Schnurr

[57] ABSTRACT

A coextruded multilayer polymeric film for use as a chub film having a core layer of an oxygen barrier material and layers disposed on either side of the core layer comprising a blend of an ethylene alpha-olefin copolymer formed from a polymerization reaction in the presence of a single site catalyst and a tie or adhesive, or alternatively a blend of a tie or adhesive and an ethylene acid copolymer, including a neutralized ethylene acid copolymer such as an ionomer. The film also comprises outer sealant layers comprising a blend of an ethylene alpha-olefin copolymer formed from a polymerization reaction in the presence of a single site catalyst and optionally a compound selected from the group consisting of LLDPE, having a density of between about 0.910 g/cc to about 0.940 g/cc, and an ethylene acid copolymer.

38 Claims, 2 Drawing Sheets

COEXTRUDED FILM FOR CHUB PACKAGES

BACKGROUND OF THE INVENTION

This invention concerns multilayer oxygen barrier polymeric films for use in the packaging of foods, especially for use in the packaging of ground meat products, such as ground beef, sausages and other comminuted food substances. The above-mentioned multilayer oxygen barrier polymeric films are called chub films.

Chub films are generally used in a vertical form fill seal (VFFS) process. In the VFFS process, a flat film of roll stock is first horizontally pulled through a forming shoulder and then vertically passed through a forming column which is connected in the forming shoulder. While the film is moving along the forming column, a tube is simultaneously formed with a longitudinal lap seal by a vertical seal bar, and, at the same time, the bottom end of the tube is closed with a wire clip. Once the tube is formed, a product with a certain weight, such as ground beef, is vertically filled and then the top end of the tube is closed by a wire clip. Finally, the package is cut apart from the following tube and transported to the packers. Such formed packages are called chub packages.

Chub packages are generally produced at a meat processing plant operated by either meat companies or supermarket chain stores for both retailer and institutional use. Chub packages are commonly treated through a chiller at about −10° to −20° C. to form crust frozen packages for longer shelf life. Package sizes usually vary from less than one pound to 10 or more pounds, depending upon the purpose of the distribution. Films used for chub packages could be clear films, pigmented films, or printed films.

Because of the commercial use, the nature of the package processing and the conditions the packages are subject to, chub films require a combination of superior performance properties, such as appearance, low temperature abuse resistance, and seal performance.

Successful films for use in above-mentioned applications include the various films produced commercially by American National Can Company and by many other companies. The most representative films are so called "moisturized films" containing nylon materials on both sides of ethylene vinyl alcohol (EVOH) copolymers, and having polyolefinic materials, such as ethylene vinyl acetate (EVA) and polyethylene, on both sides of the nylon layers. Such polyolefinic materials usually are maleic anhydride modified materials, and are used as both an adhesive layer to the nylon layer and as a sealant layer to itself.

While the above-mentioned chub packaging materials have been very successful in the meat packaging industry and the market, it is an intention of the present invention to further improve the physical and mechanical performance of chub packaging materials, especially improve the appearance, low temperature abuse resistance and seal performance. Another intention of this invention is to improve the economical performance of chub packaging materials, especially by reducing waste and cost due to the moisturization process.

Prior art chub films containing nylon have good abuse resistance, including low temperature abuse-resistance. However, in order to obtain good low temperature resistance with nylon films it is necessary to moisturize the film. It is difficult to achieve uniformity in moisturization. An excess of moisturization causes roll-stock blocking. On the other hand, insufficient moisturization causes the film to become brittle. Insufficient moisturization is a particularly common problem resulting from evaporation during the transportation or storage of chub films. As a result, the production and use of prior art nylon-containing chub films is characterized by an excessive amount of waste.

Also, prior art chub films generally do not have good adhesion between the adhesive-sealant layer and the nylon layer. This problem is further worsened by the presence of pigments, which are commonly used in chub films. As a result, it is often not possible in prior art chub films to obtain a satisfactory level of optical quality through use of a coloring pigment and still retain the necessary level of adhesion of the layers.

SUMMARY OF THE INVENTION

The films of the invention are multilayer, polymeric films for use as chub films in the packaging of foods, especially meats.

The films of the invention have improved properties of adhesion over prior art films, including increased glossiness and increased opacity. The films of the invention also have more consistent low temperature abuse resistance.

In addition to the improved physical properties over prior art films, the films of the invention also are economically and environmentally more desirable. Because the films of the invention do not require moisturization, they have lower processing costs and reduced waste than prior art films.

The film structures of the invention comprise a core layer of an oxygen barrier material such as ethylene vinyl alcohol ("EVOH"), including EVOH copolymers, Saran, polyamides and polyesters.

In a first embodiment, second and third layers are disposed on either surface of the oxygen barrier core layer. The second and third layers comprise a blend of a tie or adhesive and an ethylene alpha-olefin copolymer formed from a polymerization reaction in the presence of a metallocene, such as a single site catalyst. The ethylene/alpha-olefin copolymer, formed from a polymerization reaction in the presence of a metallocene, such as a single site catalyst comprises between approximately 50–90% by weight of the blend and the tie or adhesive comprises between approximately 50–10% by weight of the blend. Preferably, the ethylene/alpha-olefin copolymer, formed from a polymerization reaction in the presence of a metallocene, such as a single site catalyst, comprises between 60% to 75% by weight of the blend and the tie or adhesive comprises between 40% and 25% by weight of the blend.

Disposed on the surfaces of the second and third layers opposite the surface bordering the oxygen barrier core layer are fourth and fifth sealant layers comprising an ethylene alpha olefin copolymer formed from a polymerization reaction in the presence of a metallocene, such as a single site catalyst, and a linear low density polyethylene ("LLDPE") having a density in the range of approximately 0.90 g/cc to 0.940 g/cc.

In a second embodiment of the film, the fourth and fifth sealant layers are blends of an ethylene alpha-olefin copolymer formed from a polymerization reaction in the presence of a metallocene, such as a single site catalyst and an ethylene/alpha-unsaturated carboxylic copolymer, including a neutralized ethylene/alpha-unsaturated carboxylic copolymer such as an ionomer. The ethylene/alpha-olefin copolymer, formed from a polymerization reaction in the presence of a metallocene, such as a single site catalyst, comprises between approximately 50–80% of the blend by weight and the ethylene/alpha-unsaturated carboxylic copolymer comprises between approximately 50-20% of the blend by weight.

In a third embodiment of the film, the second and third layers are blends of a tie or adhesive resin and an ethylene/alpha-unsaturated carboxylic copolymer, including a neutralized ethylene/alpha-unsaturated carboxylic copolymer such as an ionomer. The tie or adhesive resin comprises approximately 20-40% of the blend by weight, and the ethylene/alpha-unsaturated carboxylic copolymer comprises between approximately 80-60% of the blend by weight. In this embodiment the fourth and fifth sealant layers may be any of the blends described in the above-referenced first and second embodiments.

In a fourth embodiment of the film, the fourth and fifth layers are a blend of a linear low density polyethylene ("LLDPE"), having a density of between approximately 0.910 g/cc and 0.940 g/cc, and an ethylene alpha olefin copolymer formed from a polymerization reaction in the presence of a metallocene, such as a single site catalyst. The ethylene/alpha-olefin copolymer, formed from a polymerization reaction in the presence of a metallocene, such as a single site catalyst, comprises between approximately 50-75% by weight of the blend and the LLDPE comprises between approximately 50-25% by weight of the blend. In a fifth embodiment of the film, the second and third layers are blends of an adhesive resin and either an ethylene/alpha-unsaturated carboxylic copolymer or an ethylene/alpha-olefin copolymer formed from a polymerization reaction in the presence of a metallocene, such as a single site catalyst. The fourth and fifth layers comprise an ethylene/alpha-olefin copolymer formed from a polymerization reaction in the presence of a metallocene, such as a single site catalyst.

In a sixth embodiment of the film, the second and third layers comprise a blend of an adhesive concentrate and an ethylene/alpha-unsaturated carboxylic copolymer. The fourth and fifth layers comprise an adhesive concentrate, an ethylene/alpha-unsaturated carboxylic copolymer and an ethylene/alpha-olefin copolymer formed from a polymerization reaction in the presence of a metallocene, such as a single site catalyst.

It should be appreciated that the films of the invention include other embodiments, such as films having additional layers disposed outside or between the various layers identified above. The films of the invention encompass films having both a symmetrical structure and an asymmetrical structure, for example, a film in which the second and fourth layers are made of different resins or different blend percentages.

The films of the invention may also include various additives that are commonly added to polymeric films. One such additive that is contemplated in the films of the invention is a coloring agent such as a whitener.

The above-referenced layers of the films of the invention may be of varying thicknesses. Generally, the oxygen barrier layer comprises between about 8% to 10% of the thickness of the film. The second and third layers each comprise approximately 5% to 25% of the thickness of the film, and the fourth and fifth layers each comprise approximately 20% to 50% of the thickness of the film. The films of the invention also include structures in which the thicknesses of the layers of the films are both symmetrical and asymmetrical, for example, the second and third layers are each of different thicknesses.

Additionally, the films of the invention encompasses packages made from or including the films of the invention, whether or not the packages are sealed or unsealed, closed or unclosed, and whether or not a product is inside the package. The films of the invention also include devices obtained by sealing the film of the invention to a substrate, such as another film, paper, cardboard or a variety of other materials. The production of such products, in which the film is sealed to a substrate, is well known in the art.

DETAILED DESCRIPTION OF THE INVENTION

Figure 1:
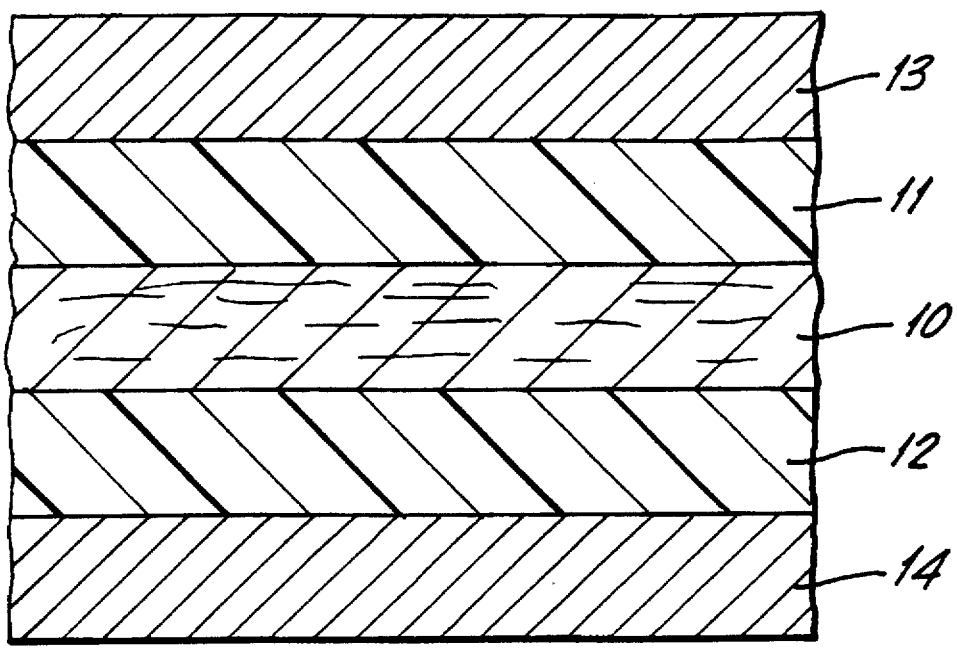
FIG. 1 is a side view of a first embodiment of the film.

Referring to FIG. 1, in a first embodiment, the film comprises a core layer 10 of an oxygen barrier material, such as an ethylene vinyl alcohol ("EVOH") or EVOH copolymer, Saran, a polyamide or polyester. Disposed on either side of core layer 10 are layers 11 and 12 of a blend of an ethylene alpha-olefin copolymer formed from a polymerization reaction in the presence of a metallocene such as a single site catalyst and an adhesive or tie. Sealant layers 13 and 14, which are disposed on layers 11 and 12, comprise a blend of an ethylene alpha olefin copolymer formed from a polymerization reaction in the presence of a metallocene, such as a single site catalyst, and an LLDPE having a density in the range of approximately 0.90 g/cc to 0.940 g/cc.

Figure 2:
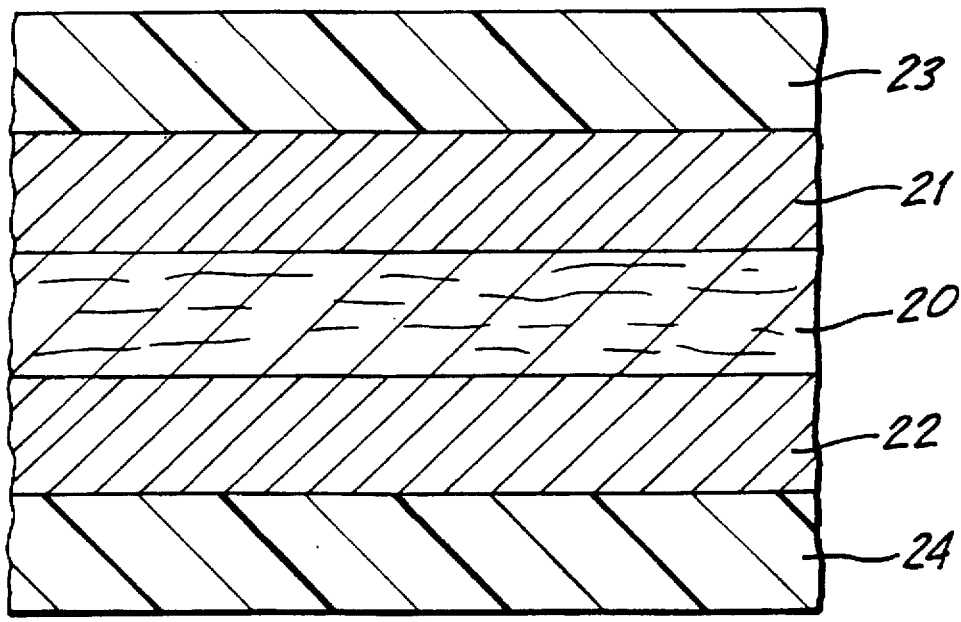
FIG. 2 is a side view of a second embodiment of the film.

Referring to FIG. 2, in a second embodiment, the film comprises a core layer 20 of an oxygen barrier material, and layers 21 and 22 comprise a blend of a tie or adhesive and a polymer formed from a polymerization reaction in the presence of metallocene such as a single site catalyst. Disposed on either side of layers 21 and 22 are sealant layers 23 and 24, comprising a blend of an ethylene alpha-olefin copolymer formed from a metallocene, such as a single site catalyst, and an ethylene/alpha-unsaturated carboxylic copolymer including a neutralized ethylene/alpha-unsaturated carboxylic copolymer such as an ionomer.

Figure 3:
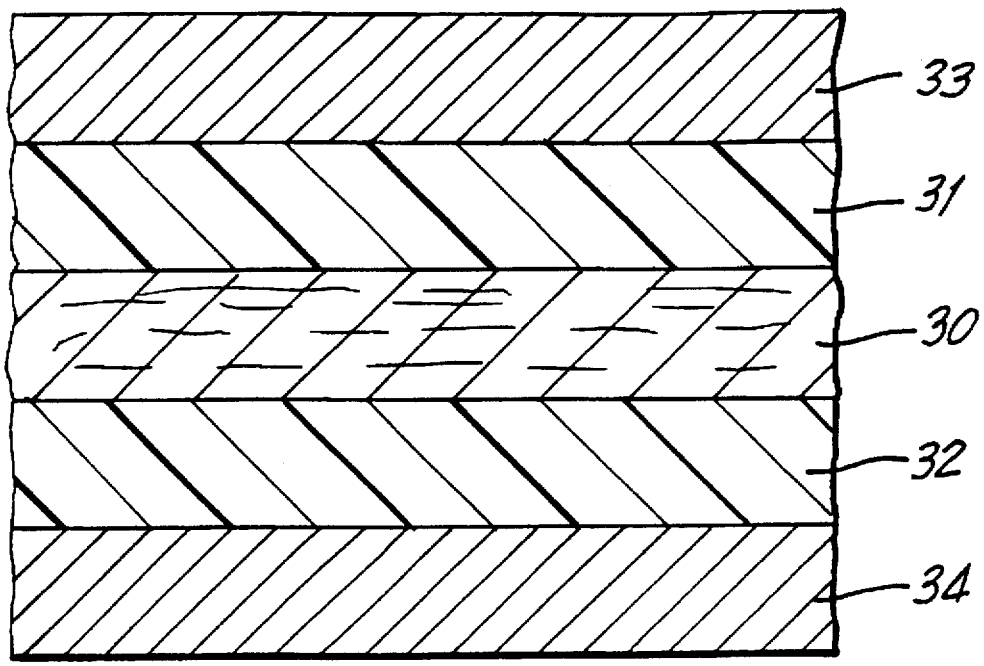
FIG. 3 is a side view of a third embodiment of the film.

FIG. 3 depicts a third embodiment of the film, comprising a core layer 30 of an oxygen barrier material. In this embodiment, layers 31 and 32 are disposed on either side of core layer 30, and comprise blends of a tie or adhesive and an ethylene/alpha-unsaturated carboxylic copolymer, including a neutralized ethylene acid copolymer such as an ionomer. Layers 34 and 35 may comprise any of the blends of the first two embodiments. Thus, layers 34 and 35 may be blends of an ethylene alpha-olefin polymer formed from a polymerization reaction in the presence of a metallocene, such as a single site catalyst, and a compound selected from the group consisting of an LLDPE having a density between about 0.910 g/cc and 0.940 g/cc and an ethylene/alpha-unsaturated carboxylic copolymer.

Figure 4:
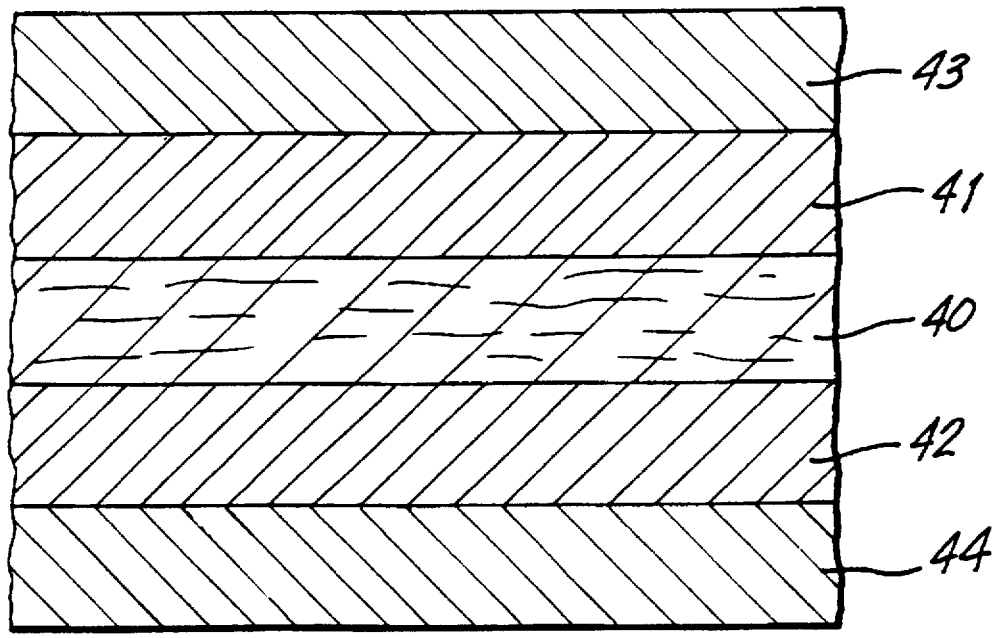
FIG. 4 is a side view of a fourth embodiment of the film.

FIG. 4 depicts a fourth embodiment. In this embodiment there is a core layer 40 of an oxygen barrier material. Disposed on either side of the core layer are second and third layers 41 and 42 which may comprise any of the blends of the first three embodiments. Disposed on either side of the second and third layers are fourth and fifth layers 43 and 44. Layers 43 and 44 comprise a blend of an ethylene alpha olefin copolymer formed from a polymerization reaction in the presence of a metallocene, such as a single site catalyst, and an LLDPE having a density between about 0.910 g/cc and 0.940 g.cc.

The invention comprises layers having a blend of a an ethylene alpha-olefin copolymer formed from a polymerization reaction in the presence of a metallocene, such as a single site catalyst. These polymers are disclosed in commonly owned and copending U.S. patent application Ser. No. 08/082,226, filed Jun. 24, 1993, which is hereby incorporated by reference.

The metallocene single site catalysts are capable of producing isotactic polymers and syndiotactic polymers, i.e., polymers in which the crystalline branches alternate regularly on both sides of the back bone of the polymer.

There are two general types of single site catalyst reactions. The first are nonstereoselective catalyst reactions which have been developed by Exxon and Dow and which are used to make Exxon's Exact resins and Dow's CGCT resins. The second type of reaction involves steroselective catalysts developed by Hoechst and Fina for stereo specific polymerization particularly of polypropylene and other olefins such as butene-1, and 4-methylpentene-1.

The ethylene alpha olefins copolymers polymerized by a metallocene catalyst have low crystallinity and a density that ranges from 0.854 to 0.970 gm/cc. Although this density range is similar to conventional ethylene polymers, i.e., LDPE and LLDPE, the polymers in the structures of the present invention have a narrow molecular weight distribution and homogeneous branching.

The tie or adhesives of the invention may be any of the various tie or adhesive resins commonly used in the trade. These resins are polymeric materials which are commonly selected for use between two other layers because their compositions have aggressive bonding properties. One example of an adhesive or tie resin is BYNEL E 364, a maleic anhydride modified LLDPE-based adhesive concentrate manufactured by dupont. Other such adhesive resins include Fusbond NB 226D, manufactured by dupont Canada, and Tymor IN05, manufactured by Morton. The particular tie or adhesive resin identified in the examples below are illustrative of the resins that can be used in the invention, and do not indicate the only tie or adhesive resins that may be used.

The sealant blend of SSC compound of the invention comprise any of a variety of polymers or copolymers which are well known in the art for use in heat seal layers. These polymers include, but are not limited to, LDPE, LLDPE, and ethylene acid copolymers such as ethylene vinyl acetate ("EVA"), ethylene methyl acrylate ("EMA"), ethylene alkyl acrylate ("EAA"), and ionomers or neutralized ethylene/ alpha-unsaturated carboxylic copolymers, as well as copolymers containing these polymers.

The particular sealant resins identified in the examples below are illustrative of the resins that can be used in the invention, and do not indicate the only sealant resins that may be used.

The linear low density polyethylene or LLDPE of the invention differs from low density polyethylene in that it is typically manufactured at much lower temperatures and pressures. The resulting LLDPE has a narrower molecular weight distribution than LDPE, and also has different rheological properties than LDPE. LLDPE typically has a density between about 0.910 g./cc. and 0.940 g./cc. LLDPE is typically a copolymer having as its comonomer an alpha-olefin such as butene, hexene, 4-methyl-1-pentene or octene.

One example of an LLDPE resin that may be used in the films of the invention is Dowlex, a resin manufactured by Dow Chemical Company. Nevertheless, the particular LLDPE resins identified in the examples below are illustrative of the resins that can be used in the invention, and do not indicate the only LLDPE resins that may be used.

The oxygen barrier materials of the invention include EVOH and EVOH copolymers, Saran, polyamides and polyesters. All of these compounds are known in the art as effective barrier layers, serving as a barrier to gases, odors, and fragrances. In the instant invention, the importance of the barrier layer is primarily as a barrier to oxygen.

The oxygen barrier materials identified in the examples below are illustrative of the oxygen barrier materials that can be used in the invention, and do not indicate the only oxygen barrier materials that may be used.

Additionally, the films of the invention may include any of various additives, such as anti-blocking agents, slip agents and various pigments. One such additive that is commonly added to polymeric films is pigments or coloring agents, such as a white concentrate. A particular pigment that may be added to the white films of the invention is $TiO_2$ concentrate.

The films of the invention are manufactured by being coextruded as a multi-layer structure through any of several coextrusion methods that are common in the art, including cast coextrusion, tubular water quenching coextrusion and blown-film coextrusion. In cast coextrusion, the film is coextruded as a flat sheet through a straight slot die. In both blown-film coextrusion and tubular water quenching coextrusion, the film is coextruded through a circular die to form a tube.

EXAMPLES

Various films of the invention were produced and tested. The produced films were measured for various physical properties that are common in the art. The following Examples 1–7 are representative examples of the films produced. These examples are only representative of the films of the invention, and are not intended to demonstrate the only films of the invention.

Similarly, the resins used in these examples are only representative examples of the various resins that can be used, and are not intended to demonstrate the only resins that can be used.

The films that were produced were measured for physical properties that are known in the art. Thus, the films were measured for their puncture value, which measures the strength of the film and its resistance to puncture. A higher value indicates a stronger resistance to puncture.

The films were also measured for their impact data at a low temperature, 14° F. The films were measured by the Kaye Ness Energy Absorption Impact Test ("EAIT") at 14° F. performed on a dart drop machine.

The secant modulus, a measure of the strain to stress ratio at a specific point of the film, was also measured. The secant modulus was measured in both the machine direction ("MD") and the cross-machine direction ("CMD").

EXAMPLE 1

A five-layer film of the invention was made by the tubular water quenching process that is well known in the art, having the structure of first core layer of 100% EVOH. Disposed on the core layer were second and third layers which were a blend of a resin known as AFFINITY, manufactured by Dow Chemical Company, and BYNEL E 364, an anhydride modified LLDPE-based adhesive manufactured by DuPont. The AFFINITY resin is an ethylene alpha-olefin copolymer formed from a polymerization reaction in the presence of a metallocene, such as a single site catalyst. AFFINITY resin is 70% of the blend by weight, and BYNEL E364 is 30% of the blend by weight.

Example 1 also has outer fourth and fifth layers which are a blend of AFFINITY and PRIMACOR, an EAA manufactured by Dow Chemical Company. The fourth and fifth layers are a blend of 68.0% by weight AFFINITY and 15.5% by weight PRIMACOR. A white concentrate is added to the fourth and fifth layers and comprises 12% of the blend by weight.

The film of Example 1 has relative thicknesses of 8% for the core layer, 10% for each of the second and third layers, and 36% for each of the fourth and fifth layers.

EXAMPLE 2

Example 2 is a five-layer film, also made by the tubular water quenching method. The film of Example 2 has a core layer of 100% EVOH. Disposed on the core layer are second and third layers which are a blend of AFFINITY and DuPont's BYNEL E-364 tie resin. The blend is 70% by weight AFFINITY and 30% by weight BYNEL E-364.

Disposed on the second and third layers are fourth and fifth layers which are a blend of AFFINITY and the PRIMACOR resin, an EAA manufactured by Dow Chemical Company. AFFINITY is 76% of the blend by weight and PRIMACOR is 19.5% of the blend by weight.

The thicknesses percentages of the layers of Example 2 are as follows: the core layer is 8%, the second and third layers each are 10%, and the fourth and fifth layers each are 36%.

EXAMPLE 3

Example 3 is a five layer film made by blown-film coextrusion having the structure of a core layer of 100% EVOH. The second and third layers, which are each disposed on the core layer, are a blend of 80% by weight Affinity and 19.4% by weight of Dow's PRIMACOR resin.

The core layer of Example 3 has a thickness of 10%. Each of the second and third layers also is 10% of the thickness of the film. The fourth and fifth layers each have a thickness of 35%.

Table 1 shows various physical properties of Examples 1–3.

TABLE 1

| EXAMPLE | IMPACT DATA AT 14° F. | | | SECANT MODULUS | |
|---|---|---|---|---|---|
| | PUNCTURE LBS. | DEFLECT | | MD | CMD |
| 1 | 3.77 | 0.51 | 0.513 | 109,700 | 110,200 |
| 2 | 3.65 | 0.48 | 0.599 | 91,120 | 97,130 |
| 3 | 4.31 | 0.4 | 0.727 | 95,150 | 94,020 |

Additionally, films of the invention were produced and tested for seal strength. Each of samples 4 through 7 were produced through the tubular water coextrusion method.

EXAMPLE 4

The film of Example 4 had a core layer of 100% EVOH. Disposed on the core layer are second and third layers of 60% by weight of the bland AFFINITY and 40% by weight of the bland BYNEL E-364. Disposed on the second and third layers are fourth and fifth layers of 65% by weight of the bland AFFINITY and 30% by weight of the blend ATTANE. ATTANE is an ethylene/octene copolymer having a density between 0.905 and 0.913 g/cc and is sold by DOW Chemical Company as an ultra low density polyethylene.

The core layer comprises approximately 10% of the thickness of the film, the second and third layers each comprise approximately 10% of the thickness of the film, and the fourth and fifth layers each comprise approximately 35% of the thickness of the film.

EXAMPLE 5

Example 5 was a five layer film, having the identical structure of Example 4 for the core layer and second and third layers. The fourth and fifth layers of Example 5 comprise 76% AFFINITY and 20% ATTANE. As in Example 4, the core layer of Example 5 comprises approximately 10% of the thickness of the film, the second and third layers each comprise approximately 10% of the thickness of the film, and the fourth and fifth layers each comprise approximately 35% of the thickness of the film.

EXAMPLE 6

Example 6 was a five layer film in which the core layer is EVOH. The second and third layers each of which are disposed in contact with the first layer, are a blend comprising 70% by weight AFFINITY and 25% by weight BYNEL E 364. The fourth and fifth layers are a blend of 76% by weight AFFINITY and 19.5% by weight PRIMACOR. The film has the following thickness ratios: 8% core layer, 10% each of the second and third layers, and 36% each of the fourth and fifth layers.

EXAMPLE 7

Example 7 is a five layer film in which the structure of the core layer is the same as in Example 6. The second and third layers of Example 7 are 60% by weight AFFINITY and 40% by weight BYNEL E 364. The fourth and fifth layers of Example 7 are identical to those of Example 6. In addition, the percent thicknesses of the layers in Example 7 are identical to those of Example 6.

The following table shows the seal strength of examples 4–7:

| EXAMPLE | SEAL STRENGTH (lbs.) |
|---|---|
| 4 | 6.0 |
| 5 | 5.8 |
| 6 | 5.0 |
| 7 | 5.2 |

The following are additional blends which may be used as second and third layers of the films of the invention. The abbreviation "SSC" refers to an ethylene alpha-olefin polymer formed from a polymerization reaction in the presence of a metallocene such as a single site catalyst.

60% SSC/40% adhesive
80% SSC/20% adhesive
75% SSC/25% adhesive
70% SSC/30% adhesive
70% EAA/30% adhesive The following are additional blends which were produced as fourth and fifth layers of the films of the invention.

77.5% SSC/20% LLDPE
75% SSC/20% ULDPE
65% SSC/30% LLDPE
65% SSC/20% ULDPE
76% SSC/20% LLDPE

76% SSC/20% ULDPE 76.6% SSC/20% ULDPE

77% SSC/20% ULDPE 76.5% SSC/20% ULDPE 77.6% SSC/19.4% EAA 75.6% SSC/18.9% EAA 76.0% SSC/19.5% EAA 76.0% SSC/19.5% EMAA 76.0% SSC/19.5% ACID COPOLYMER 68.0% SSC/15.5% EAA

Having thus described the invention, what is claimed is: We claim:

1. A coextruded multilayer polymeric chub film comprising:
   (a) a first layer comprising an oxygen barrier material, said first layer having two opposing surfaces;
   (b) a second layer comprising a blend of a maleic anhydride grafted polymer adhesive and an ethylene/alpha-olefin copolymer formed from a polymerization reaction in the presence of a metallocene catalyst, said second layer having two opposing surfaces, said second layer being disposed in contact with one of said two opposing surfaces of said first layer;
   (c) a third layer comprising a blend of a maleic anhydride grafted polymer adhesive and an ethylene/alpha-olefin copolymer formed from a polymerization reaction in the presence of a metallocene catalyst, said third layer having two opposing surfaces, said third layer being disposed in contact with said first layer opposite said second layer;
   (d) a fourth layer comprising a blend of an ethylene/alpha-olefin copolymer formed from a polymerization reaction in the presence of a metallocene catalyst, and LLDPE, having a density between about 0.910 g/cc and 0.940 g/cc, said fourth layer being disposed in contact with said second layer opposite said first layer; and
   (e) a fifth layer comprising a blend of an ethylene/alpha-olefin copolymer formed from a polymerization reaction in the presence of a metallocene catalyst, and LLDPE, having a density between about 0.910 g/cc and 0.940 g/cc, said fifth layer being disposed in contact with said third layer opposite said first layer.

2. A chub film as in claim 1, wherein said second layer comprises between approximately 50–90% by weight of said ethylene/alpha-olefin copolymer and between approximately 50–10% by weight of said adhesive and wherein said third layer comprises between approximately 50–90% by weight of said ethylene/alpha-olefin copolymer and between approximately 50–10% by weight of said adhesive.

3. A chub film as in claim 1, wherein said oxygen barrier material is ethylene/vinyl alcohol copolymer.

4. A chub film as in claim 1, wherein said chub film is manufactured by a tubular water quench method.

5. A chub film as in claim 1, wherein said chub film is manufactured by a cast coextrusion method.

6. A chub film as in claim 1, wherein said chub film is manufactured by a blown-film coextrusion method.

7. A package made from the chub film of claim 1.

8. A coextruded multilayer polymeric chub film comprising:
   (a) a first layer comprising an oxygen barrier material, said first layer having two opposing surfaces;
   (b) a second layer comprising a blend of a maleic anhydride grafted polymer adhesive and an ethylene/alpha-olefin copolymer formed from a polymerization reaction in the presence of a metallocene catalyst, said second layer having two opposing surfaces, said second layer being disposed in contact with one of said two opposing surfaces of said first layer;
   (c) a third layer comprising a blend of a maleic anhydride grafted polymer adhesive and an ethylene/alpha-olefin copolymer formed from a polymerization reaction in the presence of a metallocene catalyst, said third layer having two opposing surfaces, said third layer being disposed in contact with said first layer opposite said second layer;
   (d) a fourth layer comprising a blend of an ethylene/alpha-olefin copolymer formed from a polymerization reaction in the presence of a metallocene catalyst, and an ethylene/alpha-unsaturated carboxylic copolymer, said fourth layer being disposed in contact with said second layer opposite said first layer; and
   (e) a fifth layer comprising a blend of an ethylene/alpha-olefin copolymer formed from a polymerization reaction in the presence of a metallocene catalyst, and an ethylene/alpha-unsaturated carboxylic copolymer, said fifth layer being disposed in contact with said third layer opposite said first layer.

9. A chub film as in claim 8, wherein said second layer comprises between approximately 50–90% by weight of said ethylene/alpha-olefin copolymer and between approximately 50–10% by weight of said adhesive wherein said third layer comprises between approximately 50–90% by weight of said ethylene/alpha-olefin copolymer and between approximately 50–10% by weight of said adhesive.

10. A chub film as in claim 8, wherein said oxygen barrier material is ethylene/vinyl alcohol copolymer.

11. A chub film as in claim 8, wherein said ethylene/alpha-unsaturated carboxylic copolymer is an ionomer.

12. A chub film as in claim 8, wherein said fourth layer comprises between approximately 40% to 99% of said ethylene/alpha-olefin copolymer and between approximately 60% to 1% of said ethylene/alpha-unsaturated carboxylic copolymer and wherein said fifth layer comprises between approximately 40% to 99% of said ethylene/alpha-olefin copolymer and between approximately 60% to 1% of said ethylene/alpha-unsaturated carboxylic copolymer.

13. A chub film as in claim 8, wherein said chub film is manufactured by a tubular water quench method.

14. A chub film as in claim 8, wherein said chub film is manufactured by a cast coextrusion method.

15. A chub film as in claim 8, wherein said chub film is manufactured by a blown-film coextrusion method.

16. A package made from the chub film of claim 8.

17. A coextruded multilayer polymeric chub film comprising:
   (a) a first layer comprising an oxygen barrier material, said first layer having two opposing surfaces;
   (b) a second layer comprising a blend of a maleic anhydride grafted polymer adhesive and an ethylene/alpha-unsaturated carboxylic copolymer, said second layer having two opposing surfaces, said second layer being disposed in contact with one of said two opposing surfaces of said first layer;
   (c) a third layer comprising a blend of a maleic anhydride grafted polymer adhesive and an ethylene/alpha-unsaturated carboxylic copolymer, said third layer having two opposing surfaces, said third layer being disposed in contact with said first layer opposite said second layer;

(d) a fourth layer comprising a blend of an ethylene/alpha-olefin copolymer formed from a polymerization reaction in the presence of a metallocene catalyst, and LLDPE having a density of approximately 0.910 g/cc to 0.940 g/cc, said fourth layer being disposed in contact with said second layer; and (e) a fifth layer comprising a blend of an ethylene/alpha-olefin copolymer formed from a polymerization reaction in the presence of a metallocene catalyst, and LLDPE having a density of approximately 0.910 g/cc to 0.940 g/cc, said fifth layer being disposed in contact with said third layer.

18. A chub film as in claim 17, wherein said oxygen barrier material is ethylene/vinyl alcohol copolymer.

19. A chub film as in claim 17, wherein said chub film is manufactured by a tubular water quench method.

20. A chub film as in claim 17, wherein said chub film is manufactured by a cast coextrusion method.

21. A chub film as in claim 17, wherein said chub film is manufactured by a blown-film coextrusion method.

22. A package made from the chub film of claim 17.

23. A coextruded multilayer polymeric chub film comprising:

(a) a first layer comprising an oxygen barrier material, said first layer having two opposing surfaces;

(b) a second layer comprising a blend of a maleic anhydride grafted polymer adhesive and an ethylene/alpha-unsaturated carboxylic copolymer, said second layer having two opposing surfaces, said second layer being disposed in contact with one of said two opposing surfaces of said first layer;

(c) a third layer comprising a blend of a maleic anhydride grafted polymer adhesive and an ethylene/alpha-unsaturated carboxylic copolymer, said third layer having two opposing surfaces, said third layer being disposed in contact with said first layer opposite said second layer;

(d) a fourth layer comprising a blend of an ethylene/alpha-olefin copolymer formed from a polymerization reaction in the presence of a metallocene catalyst, and an ethylene/alpha-unsaturated carboxylic copolymer, said fourth layer being disposed in contact with said second layer opposite said first layer; and (e) a fourth layer comprising a blend of an ethylene/alpha-olefin copolymer formed from a polymerization reaction in the presence of a metallocene catalyst, and an ethylene/alpha-unsaturated carboxylic copolymer, said fifth layer being disposed in contact with said third layer opposite said first layer.

24. A chub film as in claim 23, wherein said oxygen barrier material is ethylene/vinyl alcohol copolymer.

25. A chub film as in claim 23, wherein said chub film is manufactured by a tubular water quench method.

26. A chub film as in claim 23, wherein said chub film is manufactured by a cast coextrusion method.

27. A chub film as in claim 23, wherein said chub film is manufactured by a blown-film coextrusion method.

28. A package made from the chub film of claim 23.

29. A coextruded multilayer polymeric chub film comprising:

(a) a first layer comprising an oxygen barrier material, said first layer having two opposing surfaces;

(b) a second layer comprising a blend of a maleic anhydride grafted polymer adhesive and an ethylene/alpha-unsaturated carboxylic copolymer, said second layer having two opposing surfaces, said second layer being disposed in contact with one of said opposing surfaces of said first layer;

(c) a third layer comprising a blend of a maleic anhydride grafted polymer adhesive and an ethylene/alpha-unsaturated carboxylic copolymer, said third layer having two opposing surfaces, said third layer being disposed in contact with said first layer opposite said second layer;

(d) a fourth layer comprising an ethylene/alpha-olefin copolymer formed from a polymerization reaction in the presence of a metallocene catalyst, said fourth layer being disposed in contact with said second layer opposite said first layer; and (e) a fifth layer comprising an ethylene/alpha-olefin copolymer formed from a polymerization reaction in the presence of a metallocene catalyst, said fifth layer being disposed in contact with said third layer opposite said first layer.

30. A chub film as in claim 29, wherein said chub film is manufactured by a tubular water quench method.

31. A chub film as in claim 29, wherein said chub film is manufactured by a cast coextrusion method.

32. A chub film as in claim 29, wherein said chub film is manufactured by a blown-film coextrusion method.

33. A package made from the chub film of claim 29.

34. A coextruded multilayer polymeric chub film comprising:

(a) a first layer comprising an oxygen barrier material, said first layer having two opposing surfaces;

(b) a second layer comprising a blend of a maleic anhydride grafted polymer adhesive and an ethylene/alpha-unsaturated carboxylic copolymer, said second layer having two opposing surfaces, said second layer being disposed in contact with one of said two opposing surfaces of said first layer;

(c) a third layer comprising a blend of a maleic anhydride grafted polymer adhesive and an ethylene/alpha-unsaturated carboxylic copolymer, said third layer having two opposing surfaces, said third layer being disposed in contact with said first layer opposite said second layer;

(d) a fourth layer comprising (i) a maleic anhydride grafted polymer adhesive, (ii) an ethylene/alpha-unsaturated carboxylic copolymer and (iii) an ethylene/alpha-olefin copolymer formed from a polymerization reaction in the presence of a metallocene catalyst, said fourth layer being disposed in contact with said second layer opposite said first layer; and (e) a fifth layer comprising (i) a maleic anhydride grafted polymer adhesive, (ii) an ethylene/alpha-unsaturated carboxylic copolymer and (iii) an ethylene/alpha-olefin copolymer formed from a polymerization reaction in the presence of a metallocene catalyst, said fifth layer being disposed in contact with said third layer opposite said first layer.

35. A chub film as in claim 34, wherein said chub film is manufactured by a tubular water quench method.

36. A chub film as in claim 34, wherein said chub film is manufactured by a cast coextrusion method.

37. A chub film as in claim 34, wherein said chub film is manufactured by a blown-film coextrusion method.

38. A package made from the chub film of claim 34.

* * * * *